A. W. FRENCH.
METHOD OF AND APPARATUS FOR COOKING OIL BEARING MATERIAL.
APPLICATION FILED APR. 17, 1911.
1,140,808.
Patented May 25, 1915.
2 SHEETS—SHEET 1.
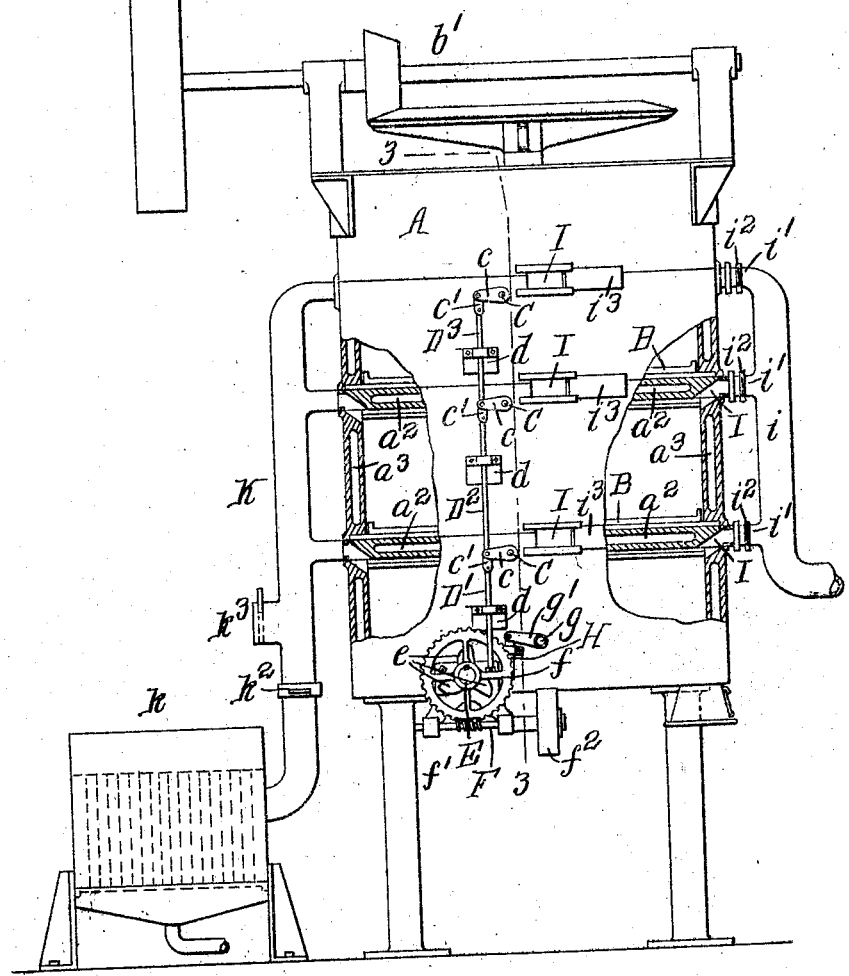

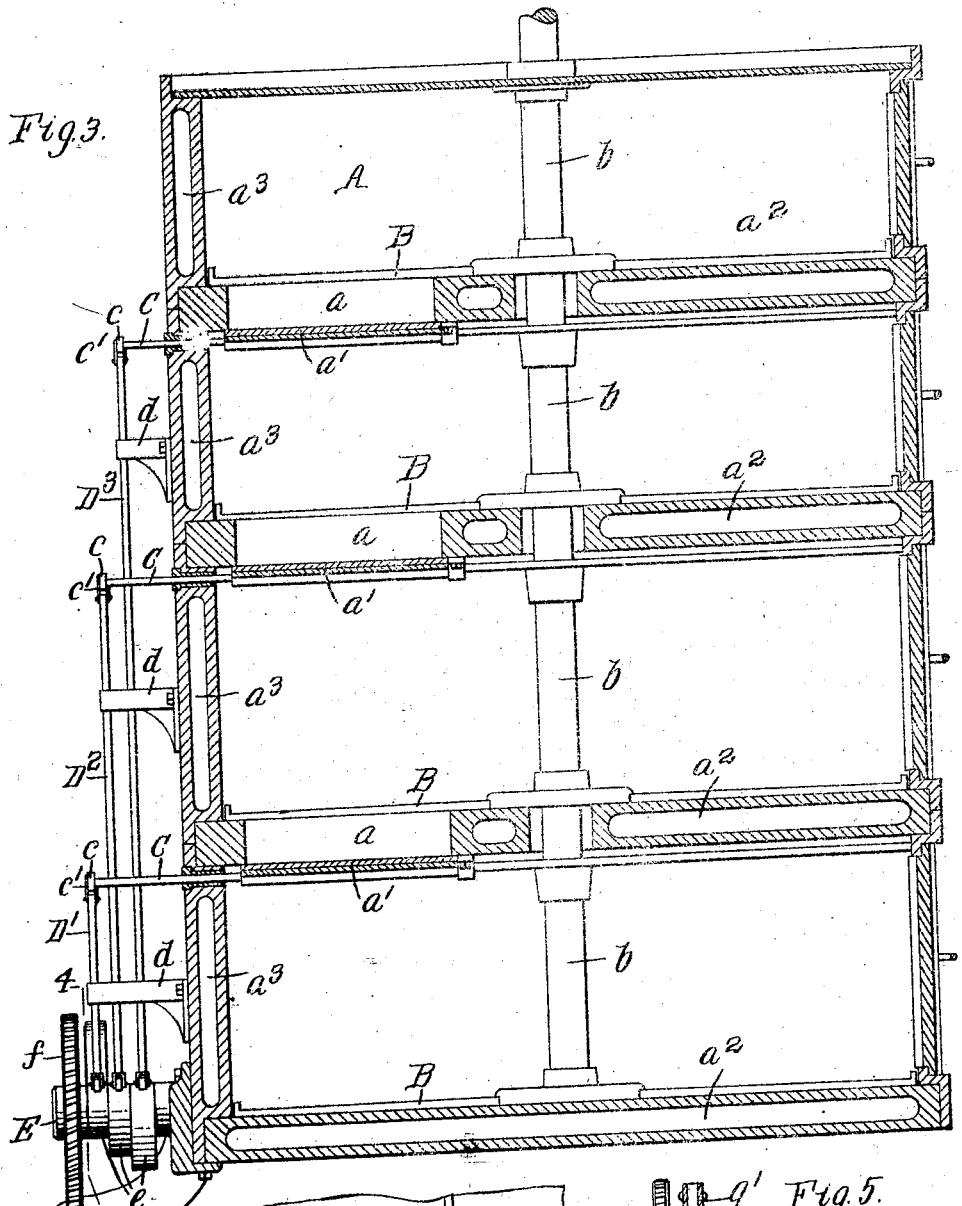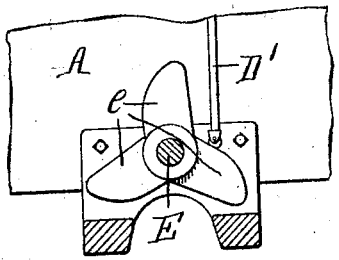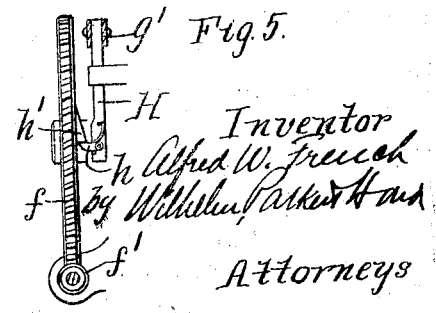

UNITED STATES PATENT OFFICE.

ALFRED W. FRENCH, OF PIQUA, OHIO.

METHOD OF AND APPARATUS FOR COOKING OIL-BEARING MATERIAL.

1,140,808. Specification of Letters Patent. Patented May 25, 1915.

Application filed April 17, 1911. Serial No. 621,452.

*To all whom it may concern:*

Be it known that I, ALFRED W. FRENCH, a citizen of the United States, residing at Piqua, in the county of Miami and State of Ohio, have invented a new and useful Improvement in Methods of and Apparatus for Cooking Oil-Bearing Material, of which the following is a specification.

This invention relates particularly to an improved method of and apparatus for cooking cotton seed meal preparatory to expressing the oil therefrom, but the method and apparatus are not necessarily restricted to this particular use.

The cookers ordinarily used for cooking cotton seed meal consist of several kettles which are arranged in a horizontal series and are filled and emptied alternately, the meal in each kettle remaining therein until cooked and then being discharged through a conveyer, or in some instances through a sub-kettle, into the cake former. The meal is usually heated for a short period of time with steam at a relatively high pressure, which results in the temperature of the meal being rapidly raised practically to the boiling point of water, after which the high temperature acts to drive off the moisture contained in the meal, thereby necessitating the addition of water if the seed is dry. This turns the meal dark and adds color to the oil, which increases the loss in refining. Great care must be exercised in cooking the meal, for if it is not cooked the requisite length of time, or if the charges in the several kettles are not uniformly cooked, the resulting product is damaged or of inferior quality. If the meal is left too wet, or green, it will creep in the press and injure the press cloths, while, on the other hand, if sufficient moisture is not left in the meal to make a firm, compact cake, there will be a loss in the yield of oil. Thus the services of an experienced meal cook are required night and day. Furthermore, considerable labor is entailed in filling and discharging the kettles, and the kettles occupy a large amount of floor space in the mill. There are cookers, used almost exclusively in linseed oil mills, in which the kettles are arranged one over the other or in a stepped or staggered series, with intervening spaces so that the tops of the kettles can be left open for the escape of the moisture driven off from the meal, but these arrangements require considerable vertical and floor space. Neither of these types of cookers has provision for timing with certainty the period of cooking in the several kettles so as to insure uniformity in the cooking, or for properly regulating the moisture of the cooked meal.

The object of this invention is to provide an improved method of and apparatus for cooking oil-bearing meals by which all of the meal remains in the cooker for a predetermined period of time and is cooked uniformly, and by which the moisture of the meal can be regulated as required, whereby the services of an experienced meal cook are dispensed with, the quality of the product, both the oil and the oil cake, is improved, the yield of the oil is increased, and the injury to the press cloths is reduced.

The accompanying drawings, consisting of two sheets, illustrate a steam cooking apparatus embodying the invention and adapted for carrying out the improved method of cooking meal.

Figure 1 is an elevation, partly in section, thereof. Fig. 2 is a fragmentary elevation, partly in section, on an enlarged scale, of the gate-operating mechanism. Fig. 3 is a sectional elevation, on an enlarged scale, in line 3—3, Fig. 1. Fig. 4 is a sectional elevation of the gate-operating mechanism in line 4—4, Fig. 3. Fig. 5 is a sectional elevation thereof in line 5—5, Fig. 2.

Like reference characters refer to like parts in the several figures.

A represents steam cooking kettles or chambers which are preferably arranged one directly over and upon the other, so that the bottom of one kettle forms the top of the one next below. The kettles have bottom discharge openings $a$, controlled by swinging or other suitable gates $a'$, through which the meal can discharge by gravity from kettle to kettle and can be drawn from the bottom kettle. Any suitable number of kettles may be employed. In the cooker illustrated there are four kettles, all having hollow bottoms $a^2$ forming steam chambers which are supplied with steam by the usual or any suitable means (not shown) for cooking or heating the meal. The two upper kettles are preferably shallower than the others and are provided with hollow or jacketed walls $a^3$ also supplied with steam for the purpose of quickly heating the meal therein to the required temperature.

B represents the usual rotary stirrers or scrapers consisting of arms projecting radially from a central vertical shaft $b$ which is driven by any suitable means $b'$. The stirrers scrape the bottoms of the kettles, keeping the meal in motion so as to prevent it from being scorched, and causing it to discharge readily from one kettle into the next.

The meal is fed automatically to the top kettle and is drawn from the bottom kettle in measured quantities into the cake former or molding machine at substantially regular intervals in the usual or any suitable way. When the bottom kettle has been emptied or a predetermined quantity of meal drawn therefrom, the other kettles are discharged periodically and in succession by mechanism which first opens the gate of the second kettle to discharge its contents into the bottom kettle and closes this gate, then opens and closes the gate of the third kettle to refill the second kettle therefrom and closes this gate before opening the gate of the next kettle above, which operation is continued until the meal is delivered from each kettle of the series except the bottom kettle to the kettle next below. In this way substantially uniform quantities or charges of meal pass from each kettle to the next at regular intervals, and a definite period of time, depending upon the rate at which the meal is drawn from the bottom kettle, is required for a particular batch of meal to pass through the cooker, with the result that all of the meal is uniformly cooked. The charges are also regulated so that they will only partially fill the kettles, and thus leave air spaces in the kettle above the meal therein.

The gates are preferably actuated by power-driven mechanism, which, after thus operating the gates of the several kettles in succession, comes to rest, and is again started manually, or by means which are automatically controlled by the quantity of meal in the bottom kettle. The mechanism shown in the drawings for this purpose is like that disclosed in my co-pending application Serial No. 549,312, filed March 14, 1910, and is constructed as follows: The gates $a'$ of the kettles above the bottom one are secured to rock-shafts C which extend out of the cooker and are connected by rock arms $c$ and links $c'$ to the upper ends of vertical rods $D'$ $D^2$ $D^3$. The several rods $D'$—$D^3$ are slidable vertically in suitable guides $d$ on the cooker and are adapted to be lifted successively by a series of arms or cams $e$ on a gate-operating shaft E which is suitably journaled on the cooker. The rod actuating arms or cams $e$ are arranged at such angles on the shaft E that one rod, $D'$, is reciprocated to open and again close the gate of the second kettle before the next rod $D^2$ is raised to open the gate of the third kettle, each gate being opened and closed in this way before the next gate is opened, so that the meal is discharged from the second kettle into the bottom kettle and the gate of the second kettle closed before the meal is discharged from the third kettle into the second kettle, and so on. The rods $D'$—$D^3$ are preferably heavy enough to close the gates by their weight. The shaft E can be driven at the proper speed in any suitable way, for instance, it is connected by a worm wheel $f$ and worm $f'$ to a drive shaft F provided with a pulley $f^2$ for a drive belt. The worm wheel $f'$ shown is mutilated so that when the shaft E has made one revolution and operates the several gates in succession once, it comes to rest in the position shown in Fig. 2 and the gate-operating mechanism remains at rest until again started by turning the worm wheel $f$ sufficiently to bring its teeth again into mesh with the worm $f'$. This can be done by hand but is preferably accomplished automatically by a starting device which is controlled by the level of the meal in the bottom kettle. The starting device consists of a blade or plate G in the bottom kettle fixed to a rock-shaft $g$ which is provided with an arm $g'$ connected to a pawl-carrier H which is provided with a pawl $h$ adapted to engage a tooth or projection $h'$ on the worm wheel $f$. The plate G is normally held up substantially in the position shown in Fig. 2, or caused to float, by the horizontal motion of the meal in the kettle. When the level of the meal in the bottom kettle is lowered to a predetermined point, the blade G will swing downwardly, thereby rocking the shaft $g$ and moving the pawl $h$ so as to turn the worm wheel $f$ to place its teeth in mesh with the worm $f'$ and thus start the gate-operating mechanism. The operation of the cooker is thus made automatic, the gates being actuated in succession to deliver the meal from one kettle to the next one below, as explained, whenever the predetermined quantity of meal has been drawn from the bottom kettle.

Other suitable mechanism for operating the gates to discharge the kettles successively in the described manner could be employed.

I represents vent holes provided in the upper portions of the kettles for the escape of the moisture rising from the meal. An exhaust trunk or pipe $i$ connected by branches $i'$ with the vent holes I at one side of the cooker leads to an exhaust fan or device (not shown) for drawing off the moisture from the kettles. Dampers $i^2$ in the branches of the exhaust pipe enable the suction from the several kettles to be controlled for the purpose of drawing off more or less moisture as required, depending upon the condition of the meal.

K represents an air supply pipe leading from an air heater $k$ of any suitable kind and connected by branch pipes with the vent holes of the kettles. Preferably the suction and air supply pipes connect with vent holes at opposite sides of the cooker. The air supply pipe is provided with a damper $k^2$ and with a cold air inlet controlled by a damper $k^3$. By properly adjusting these dampers the air admitted to the kettles can be tempered as required.

The vent holes I which are between those connecting with the suction and air supply pipes are preferably provided with gates or valves $i^3$ of any suitable sort for partially or wholly closing them. These intermediate vent holes are sufficiently large and numerous to allow the escape of moisture from the meal when it is relatively dry, but when the vapor driven off from the meal cannot escape naturally through these vent holes, they are closed to prevent the admission of cold air, which condenses the moisture and chills the meal, and the vapor is drawn off through the exhaust trunk $i'$. When the meal is very wet, hot air from the supply pipe $k$ is drawn through the kettles by the exhauster for more rapidly drying the meal, the temperature of the air being regulated according to the condition of the meal, by proper adjustments of the dampers $k^2$ and $k^3$. The air is heated to such a temperature that it will not condense the vapor in the kettles. When the seed is dry the vent holes I can be closed so that the natural moisture in the meal may be retained. Thus the moisture can be prevented from escaping from the kettles when this is necessary on account of the meal being dry, and the meal can be dried more or less, as required, by the proper use of the exhausting and air supplying means. Vent holes between the air supply and exhaust pipes are not absolutely essential and, if desired, the moisture can be removed and the hot air supplied by a forced draft instead of by exhaustion.

The described means for maintaining the air spaces in the kettles above the meal and for carrying off the moisture, besides enabling the regulation of the moisture of the meal as stated, enables the kettles to be placed directly over and upon each other, which obviates the necessity for the large spaces between the kettles heretofore required when the kettles were arranged in a descending series for the escape of the moisture. The height of the cooker is, therefore, greatly reduced and of course the cooker requires only the floor space necessary for a single kettle in the horizontal arrangement.

In the cooking process the meal passes in succession from one kettle to the next, the time required for the passage of every portion of meal being substantially the same. The meal is subjected both at the bottom and the sides to the steam heat in the two upper kettles, and the bottom of the top kettle also heats the top portion of the meal in the second kettle, so that as the quantity of meal in these two kettles is relatively small the meal is quickly raised to the necessary cooking temperature in the first two kettles. The steam pressure on the other kettles need be only sufficient to retain the meal at the temperature given it in the two upper kettles so as to retain the heat in the meal and allow it to cook practically by its own heat. The lower kettles are also preferably of larger capacity than the upper ones, so that it requires longer for the meal to pass through these kettles, and the meal is therefore cooked slowly in these kettles at a moderate heat for a longer time than it can be kept in the greater heat of the upper kettles, which results in thoroughly softening the oil cells of the meal so that they will more readily give up their oil under pressure, without either driving off the necessary moisture or scorching or discoloring the meal. The long slow cooking of the meal also coagulates the albumin in the meal so that the meal will not creep in the press and burst the press cloths, as it does when cooked more rapidly.

While the described arrangement of the kettles, one vertically over and directly upon the other, is preferred for the reasons stated, yet the described continuous process of cooking can be carried out with other arrangements of the kettles so long as they are disposed in a descending series and have provision for regulating the quantity of meal therein, as stated.

I claim as my invention:

1. The combination with a plurality of cooking kettles or chambers of solid material arranged in a descending series and provided with means for heating the material, of mechanism for discharging material from the kettles above the bottom kettle in succession and for positively stopping the discharge of the material from one kettle before the discharge of material commences from the kettle above, and means for definitely regulating the moisture in the material in at least some of said kettles.

2. The combination with a plurality of cooking kettles or chambers for solid material provided with discharge openings and with means for heating the material and arranged to discharge the material from one kettle into another, of mechanism for discharging the kettles above the bottom one periodically one after the other commencing with the second kettle and for positively closing the discharge opening of one kettle before the discharge of material commences from the kettle above, whereby the material is discharged first from the second kettle into the bottom kettle, then from the third kettle into the second kettle and so on and the quantity of the material in the kettles is regulated, and means for exhausting air from the upper portions of at least some of said kettles to carry off the moisture from the material.

3. The combination with a plurality of cooking kettles or chambers for solid material provided with discharge openings and with means for heating the material and arranged to discharge the material from one kettle into another, of automatic mechanism which operates to discharge material from the kettles above the bottom one periodically one after another commencing with the second kettle when a predetermined quantity of the material has been withdrawn from the bottom kettle and for closing the discharge opening of one kettle before the discharge of material commences from the kettle above, whereby the material is discharged first from the second kettle into the bottom kettle, then from the third kettle into the second kettle and so on and the quantity of the material in the kettles is regulated, and means for exhausting the moisture arising from the material in at least some of said kettles.

4. The combination with a plurality of closed cooking kettles or chambers for solid material provided with discharge openings and with means for heating the material and arranged to discharge the material from one kettle into another, of means for discharging the kettles above the bottom one periodically one at a time commencing with the second kettle and for closing the discharge opening of one kettle before the discharge of material commences from the kettle above, whereby the material is discharged first from the second kettle into the bottom kettle, then from the third kettle into the second kettle and so on and the quantity of material in the kettles is regulated, and means for causing a current of air to flow over the material in at least some of said kettles to carry off the moisture arising from the material in said kettles.

5. The combination with a plurality of cooking kettles or chambers for solid material provided with discharge openings and with means for heating the material and arranged in a descending series to permit the material to discharge from one kettle into another, of gates for the discharge openings of the kettles above the bottom one, mechanism for actuating said gates for discharging material from the kettles one after another commencing with the second kettle and closing the gate for one kettle before the gate of the kettle above is opened, whereby the material is discharged first from the second kettle into the bottom kettle, then from the third kettle into the second kettle and so on, and means for exhausting air from the upper portions of at least some of said kettles for definitely regulating the moisture of the material.

6. The combination with a plurality of closed cooking kettles or chambers for solid material provided with discharge openings and with means for heating the material and arranged in a descending series to permit the material to discharge from one kettle to another, of automatic mechanism controlled by the quantity of material in the bottom kettle for discharging material from the kettles above the bottom one periodically one at a time commencing with the second kettle and for closing the discharge opening of one kettle before the discharge of material commences from the kettle above, whereby the material is discharged first from the second kettle into the bottom kettle, then from the third kettle into the second kettle and so on and the quantity of the material in the kettles is regulated, and means for exhausting the air from the upper portions of at least some of said kettles to carry off the moisture from the material.

7. The herein described continuous process of cooking oil-bearing material, consisting in heating the material in a series of kettles arranged in a descending series, causing material to discharge from the kettles above the bottom one periodically one after another commencing with the second kettle and stopping the discharge from one kettle before the discharge commences from the kettle above, whereby the material is discharged first from the second kettle into the bottom kettle, then from the third kettle into the second kettle and so on, and exhausting the moisture arising from the material in at least some of said kettles for regulating the moisture in the material.

8. The herein described continuous process of cooking oil-bearing material, consisting in heating the material in a series of closed kettles arranged to permit the material to discharge from one kettle into another, causing the material to discharge from the kettles above the bottom kettle one after another commencing with the second kettle and stopping the discharge from one kettle before the discharge commences from the kettle above, whereby the material is discharged first from the second kettle into the bottom kettle and then from the third kettle into the second, and circulating air over the material in at least some of said kettles to regulate the moisture of the material.

9. The herein described continuous process of cooking oil-bearing material consisting in heating the material in closed kettles arranged to permit the material to discharge from one kettle into the next, causing material to discharge from the kettles above the bottom one periodically one at a time commencing with the second kettle and stopping the discharge from one kettle before the discharge commences from the kettle above, whereby the material is discharged first from the second kettle into the bottom kettle, then from the third kettle into the second kettle and so on and the quantity of material in the kettles is regulated, and positively regulating the moisture in the material in the kettles.

10. The herein described continuous process of cooking oil-bearing material, consisting in heating the material in closed kettles arranged to permit the material to discharge from one kettle to the next, causing material to discharge from the kettles above the bottom one periodically one at a time commencing with the second kettle and stopping the discharge from one kettle before the discharge commences from the kettle above, whereby the material is discharged first from the second kettle into the bottom kettle, then from the third kettle into the second kettle and so on and the quantity of material in the kettles is regulated, supplying tempered air to the upper portions of at least some of the kettles, and exhausting the air to carry off the moisture driven off from the material in said kettles.

11. The herein described continuous process of cooking oil-bearing material, consisting in heating the material in a series of kettles arranged to permit the material to discharge from one kettle to another, causing the material to discharge from the kettles above the bottom one in succession at definite periods after a predetermined quantity of material has been withdrawn from the bottom kettle and stopping the discharge from one kettle before the discharge commences from the kettle above, whereby the material is discharged first from the second kettle into the bottom kettle, then from the third kettle into the second kettle and so on.

12. The combination with a plurality of closed chambers for solid material provided with discharge openings and arranged in a descending series to permit the discharge of material from chamber to chamber, and means for heating the material, of gates for the discharge openings of the chambers above the bottom one, driven mechanism for opening and closing said gates periodically whereby the material is discharged periodically from one chamber into another and the quantity of the material in the chambers is regulated, and means for exhausting air from the upper portions of at least some of said chambers to carry off the moisture from the material.

13. The combination of a plurality of heating kettles or chambers arranged in a descending series and each kettle except the lowest having a discharge opening arranged to deliver the material into a lower kettle, gates controlling said discharge openings, actuating rods connected to the several gates, and a rotary shaft provided with a series of arms arranged to operate said gate-actuating rods in succession.

14. The combination of a plurality of heating kettles or chambers arranged in a descending series and each kettle except the lowest having a discharge opening arranged to deliver the material into a lower kettle, gates controlling said discharge openings, actuating rods which are connected to the several gates and operate to close the gates and normally retain them in closed position, and a rotary shaft provided with a series of arms arranged to actuate said rods in succession to open the gates.

15. The combination of a plurality of heating kettles or chambers arranged in a descending series and each kettle except the lowest having a discharge opening arranged to deliver the material into a lower kettle, gates controlling said discharge openings, and driven mechanism which opens and closes said gates in succession and is constructed to automatically come to rest after opening and closing the several gates once.

16. The combination of a plurality of heating kettles or chambers arranged in a descending series and each kettle except the lowest having a discharge opening arranged to deliver the material into a lower kettle, gates controlling said discharge openings, driven mechanism which opens and closes said gates in succession and is constructed to automatically come to rest after opening and closing the several gates once, and means for starting said mechanism.

17. The combination of a plurality of heating kettles or chambers arranged in a descending series and each kettle except the lowest having a discharge opening arranged to deliver the material into a lower kettle, gates controlling said discharge openings, driven actuating mechanism for said gates, and means governed by the quantity of material in one of said kettles for causing the periodic operation of said gate-actuating mechanism.

18. The combination of a plurality of heating chambers arranged in a descending series and each chamber above the lowest having a discharge opening arranged to deliver the material into a lower chamber, gates controlling said discharge openings, and driven mechanism which opens and closes the gates of said chambers one after another at regulated intervals.

19. In an apparatus of the character specified, a series of kettles arranged one above the other, with discharge openings from one kettle to the kettle next below and doors for the openings, with means for mechanically opening and closing each door in succession in timed relation to each other.

20. In an apparatus of the character specified, a series of kettles arranged one above the other, with discharge openings from one kettle to the kettle next below and doors for the openings, with cams for opening and closing the doors, and means for actuating the cams in timed relation to open and close each door in succession.

21. In an apparatus of the character specified, a series of kettles arranged one above the other, with discharge openings from one kettle to the kettle next below and doors for the openings, with means for mechanically opening and closing each door in succession in timed relation to each other, and mechanism for disconnecting the door actuating means at the termination of each cycle of operation.

Witness my hand, this 25 day of February, 1911.

ALFRED W. FRENCH.

Witnesses:
J. E. PHILLIPS,
L. E. COSTLEY.